(12) United States Patent
Shuert

(10) Patent No.: US 8,070,402 B2
(45) Date of Patent: Dec. 6, 2011

(54) FRAME STACKING METHODS AND SPACERS

(75) Inventor: Lyle H. Shuert, Bloomfield Hills, MI (US)

(73) Assignee: Shuert Technologies, LLC, Sterling Heights, MI (US)

(*) Notice: Subject to any disclaimer, the term of this patent is extended or adjusted under 35 U.S.C. 154(b) by 618 days.

(21) Appl. No.: 12/102,089

(22) Filed: Apr. 14, 2008

(65) Prior Publication Data

US 2009/0257840 A1 Oct. 15, 2009

(51) Int. Cl.
*B61D 3/16* (2006.01)
(52) U.S. Cl. ............... 410/43; 410/32; 410/40; 410/155
(58) Field of Classification Search .............. 410/43, 410/32, 156, 31, 40, 155, 56; 414/406, 803
See application file for complete search history.

(56) References Cited

U.S. PATENT DOCUMENTS

| 3,131,648 A * | 5/1964 | Seger ........................... 410/119 |
| 3,762,343 A | 10/1973 | Thacker |
| 3,878,980 A | 4/1975 | Crane |
| 3,935,991 A | 2/1976 | Crane |
| 4,611,962 A * | 9/1986 | Braly et al. ..................... 410/57 |
| 4,650,381 A * | 3/1987 | Durkin ........................... 410/43 |
| 4,678,084 A | 7/1987 | Maker et al. |
| 5,273,170 A | 12/1993 | Azzopardi et al. |
| 6,183,176 B1 * | 2/2001 | Weiner ........................... 410/32 |
| 6,390,152 B1 | 5/2002 | Donovan et al. |
| 6,585,126 B1 | 7/2003 | Grigsby, Sr. et al. |
| 7,674,087 B2 * | 3/2010 | He et al. ........................ 414/802 |
| 2006/0188356 A1 * | 8/2006 | Tschantz et al. ............. 410/119 |
| 2007/0160823 A1 * | 7/2007 | Pyzik et al. ................ 428/304.4 |
| 2007/0264097 A1 * | 11/2007 | Fellon et al. ..................... 410/32 |

* cited by examiner

*Primary Examiner* — Glenn Dayoan
*Assistant Examiner* — SunSurraye Westbrook
(74) *Attorney, Agent, or Firm* — Young Basile Hanlon & MacFarlane PC

(57) ABSTRACT

A method and apparatus for increasing the volumetric efficiency with which automotive vehicle frames are stacked on a carrier such as a railroad flat car. Frames are alternately reversed end-for-end and/or laterally offset from one another and may be longitudinally angled and internested between adjacent stacks. Twin sheet molded HDPE spacers are used.

14 Claims, 8 Drawing Sheets

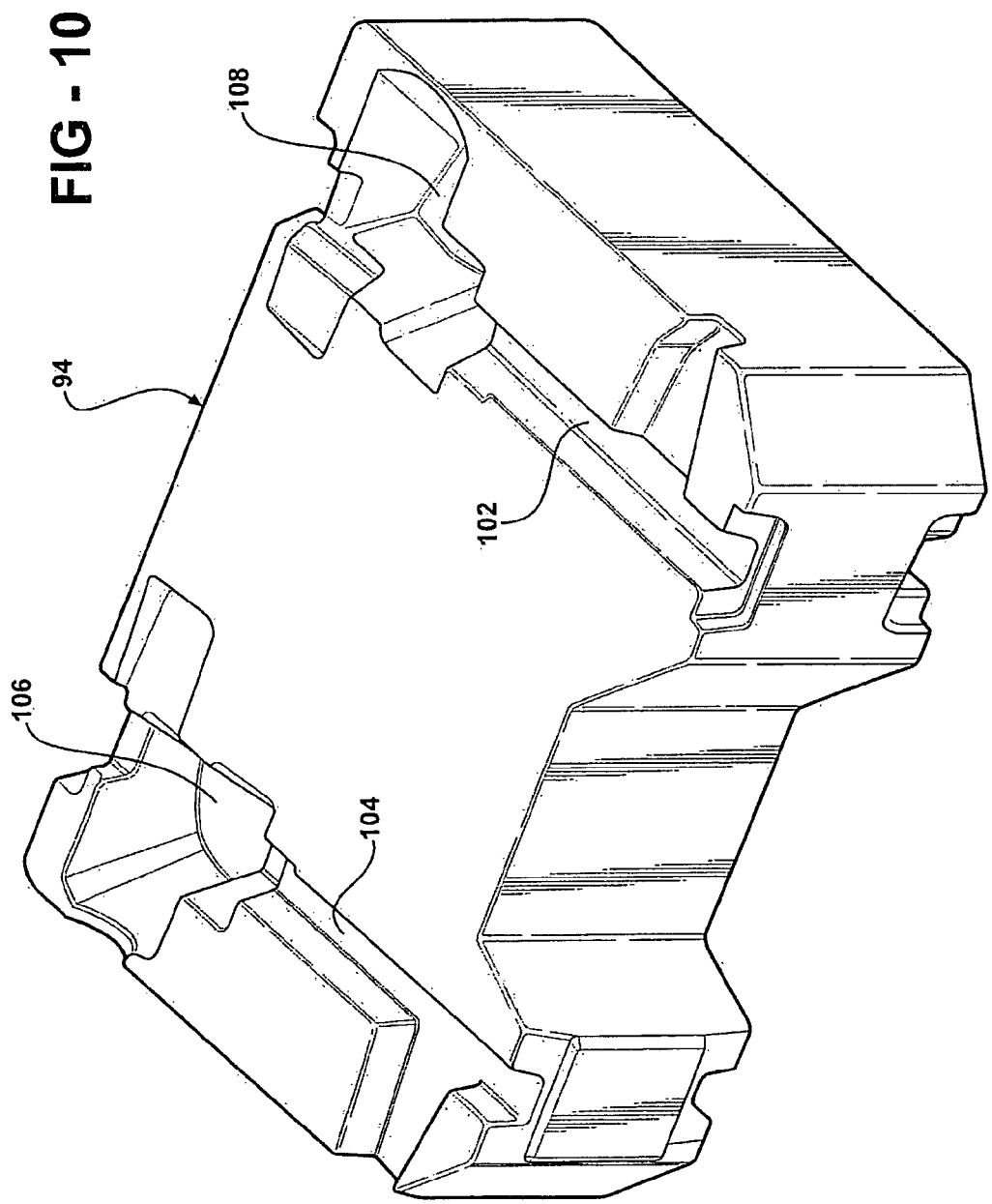

FRAME STACKING METHODS AND SPACERS

FIELD OF THE INVENTION

This invention relates to the transportation of automotive vehicle frames and, more particularly, to methods and apparatus for loading automotive vehicle frames on a carrier such as the load bed of a railroad car in multiple vertical stacks so as to maximize the number of frames which can accommodated within a given volume of space on and above the carrier surface.

BACKGROUND OF THE INVENTION

It is currently known to ship automotive vehicle frames from, for example, a fabrication plant to an assembly plant by railroad flatcar. Typically, the frames are stacked vertically one atop the other using underlying pallets and spacers which are known in the art as "pin bars" and which comprise steel structures approximately 20 inches in height with a base plate and a top plate joined by welded steel struts. A long steel pin projects upwardly through the top plate so that it can fit into holes which are strategically located in the frame rails. After a number of frames are stacked one on top of the other using pin bars in front and rear sets, the stacks are covered and strapped down. The stack must be firmly and securely strapped because it is relatively unstable and cannot be permitted to shift laterally or longitudinally during transportation on the rail car. The loading of frames on rail ears in this mariner is typically space-limited rather than weight-limited; i.e., volume limitations imposed on rail cars and flatbed trucks can be exceeded before the weight load limit is reached.

BRIEF SUMMARY OF THE INVENTION

I have found that it is possible through strategic arrangements of the vehicle frames relative to one another, within the stacks and/or between adjacent stacks, to load more frames on a given bed while staying within a given space or volume limitation. Through the use of my invention and its various aspects as hereinafter described, it is possible to substantially reduce the cost of transporting vehicle frames by rail and/or by truck.

As hereinafter described, the frames with which my invention has its greatest industrial value and utilization are frames of the type comprising a pair of essentially parallel, spaced apart, frame rails joined by one or more cross members and bearing various mounting appendages for the attachment of a vehicle body, as well as drive train and suspension system components. The frames hereinafter described in the utilitarian embodiments of my invention are three-dimensional in the sense that the frames have center spans which are lower than contiguous front and rear spans. Moreover, most frames are non-symmetrical about one or both of longitudinal and lateral centerlines; e.g., the portion of a frame in front of the centerline is different in both length and elevation than the portion to the rear of the centerline. To put it another way, the front and rear halves are not mirror images of one another.

In one form of my invention hereinafter described, the frames in a given stack are alternatingly reversed end for end and typically laterally offset from one another in an alternatingly staggered relationship. Spacers accommodating this orientation are placed between frames in a given stack. The spacers are preferably made of molded "twin sheet" plastic construction and nestingly receive the frame rails and, where necessary, the cross rods and various mounting appendages found on such frames. Of course, materials other than plastic may be used. The dunnage spacers are generally configured to accommodate on lower surface parts at one end of each frame and on upper surface parts at the opposite end of each frame.

In another form hereinafter described, my invention involves placing stacks of frames on a load surface in longitudinally adjacent relationship and intermeshing or overlapping one frame stack relative to the longitudinally next adjacent frame stack. The frame stacks can be in alignment with or angled relative to the load surface longitudinal axis. Although this can be done otherwise, I prefer to achieve this using dunnage elements or spacers which are of one type at one end of a frame and another type at the other end of a frame stack. The spacers which are immediately adjacent one another at the most proximate point between longitudinally adjacent stacks are configured not only to nestingly receive the vehicle frames therein but also to complementally interfit with one another.

In all of the embodiments of my invention and in all of the spatial relationships, the stacking is preferably done on a pallet, which allows the frame stacks to be easily moved onto and off of railroad cars using fork lifts and cranes. Moreover, starter dunnage elements that can be one-sided can be used on the pallets for the first or lowermost frame in the stack or, in the alternative, the starter dunnage elements can be molded integrally with the pallets themselves.

Similarly, top or cover plates of molded plastic or other suitable materials are placed over the stacks to receive straps that secure the stacks to the loading surface.

According to another aspect of my invention, I achieved a maximum volumetric stacking or arranging of automotive vehicle frames in a given volume by creating a database from which two or more images of a given frame can be generated and displayed in three-dimensions and manipulated or rotated in space relative to one another. The method further comprises the step of presenting two or more of the frames for which data is provided in the database on a graphic computer screen and variously reorienting the frames in space using the principles described above to determine the exact relationship between frames which will optimize the number of frames which can be fit into a given area or volume, with height being the principal factor. From this determination, one can then design dunnage elements or spacers to achieve the arrangement that is found to be optimum using graphic representations of frames.

In another aspect, my invention also comprises the dunnage elements themselves, which elements are preferably made of twin-sheet molded plastic, and are configured to be somewhat wider than the distance between parallel rails of a given frame, and to have recesses on one surface; e.g., the top surface, designed to receive one end of a frame in nesting relationship therewith. For elements which nest between frames, recesses are also formed on the opposite, or bottom surface, designed to receive nestingly therein the other end of the frame which underlies each spacer. Typically two types of configurations of spacers are used between frames in a stock.

BRIEF DESCRIPTION OF THE DRAWINGS

FIG. 10 is a perspective view of the spacer of FIG. 9.

DETAILED DESCRIPTION OF THE ILLUSTRATIVE EMBODIMENTS

Figure 1:
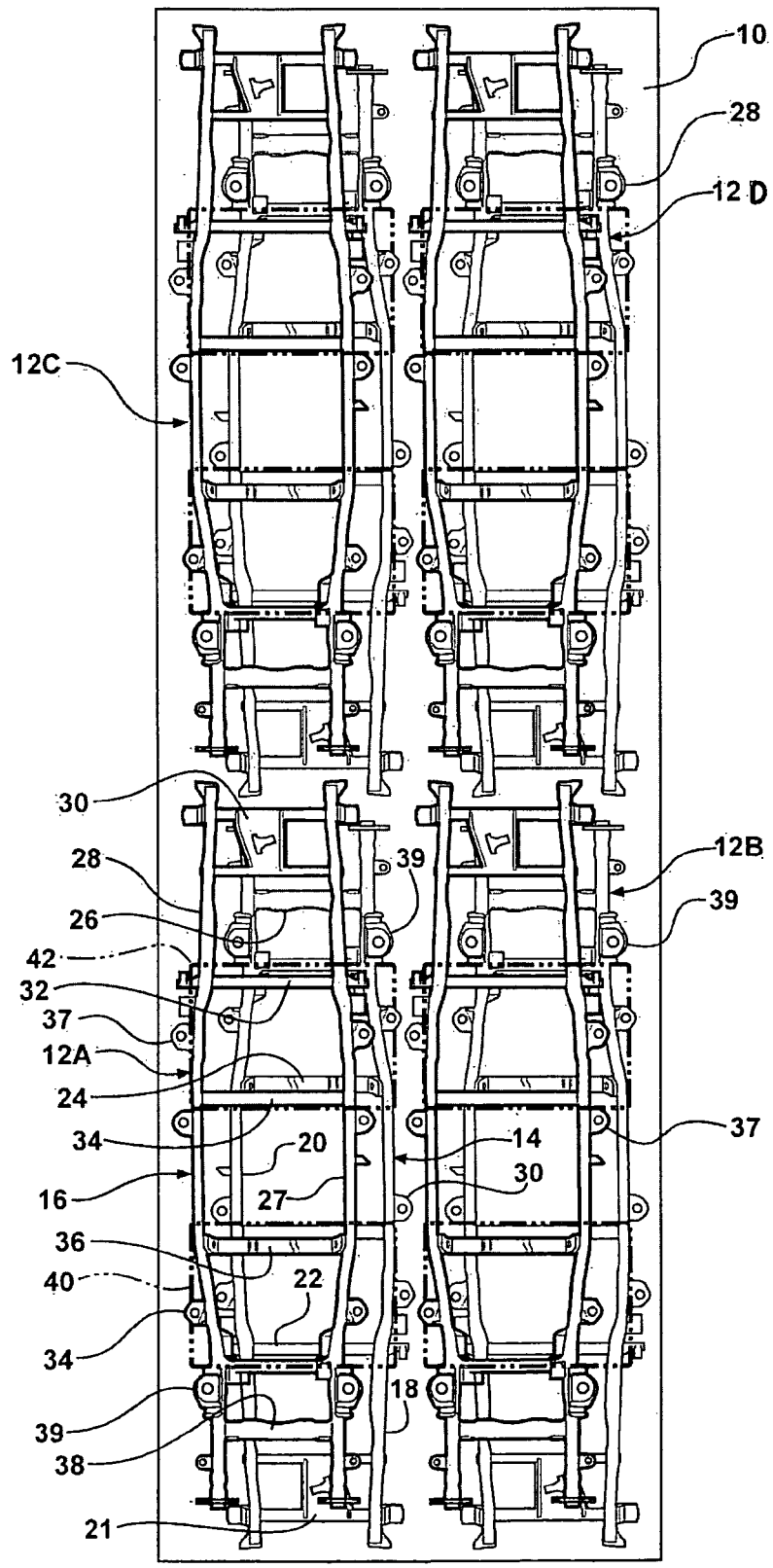
FIG. 1 is a top plan view of four frame stacks on a representative portion of the load surface of a railroad car with spacer locations shown in broken lines.

Looking to FIG. 1, there is shown in plan view a representative portion of a loading surface 10 of, for example, a railroad flat car. On the loading surface 10 are four stacks 12A, 12B, 12C and 12D of identical automotive vehicle frames 14 and 16, in this case steel frames for light trucks. The lowermost frame 14 in each stack is arranged north to north on the loading surface 10 while the next uppermost frame 16 is arranged north to south; longitudinally reversed with respect to the next lower frame 14. All four stacks exhibit this alternatingly end-for-end reversal between vertically adjacent frames.

The lowermost frame 14 comprises substantially parallel but laterally spaced apart frame rails 18 and 20 joined by cross-members 21, 22, 24 and 26 whereas the uppermost frame 16 is made up of substantially parallel spaced apart frame rails 27 and 28 with cross-members 30, 32, 34, 36 and 38. Each frame, irrespective of its position in the stack, is also provided with suspension mounts 39 and body mounts 37, the arrangement shown here being typical of certain light truck frames in production in the United States at the time this application is being filed.

Figure 3:
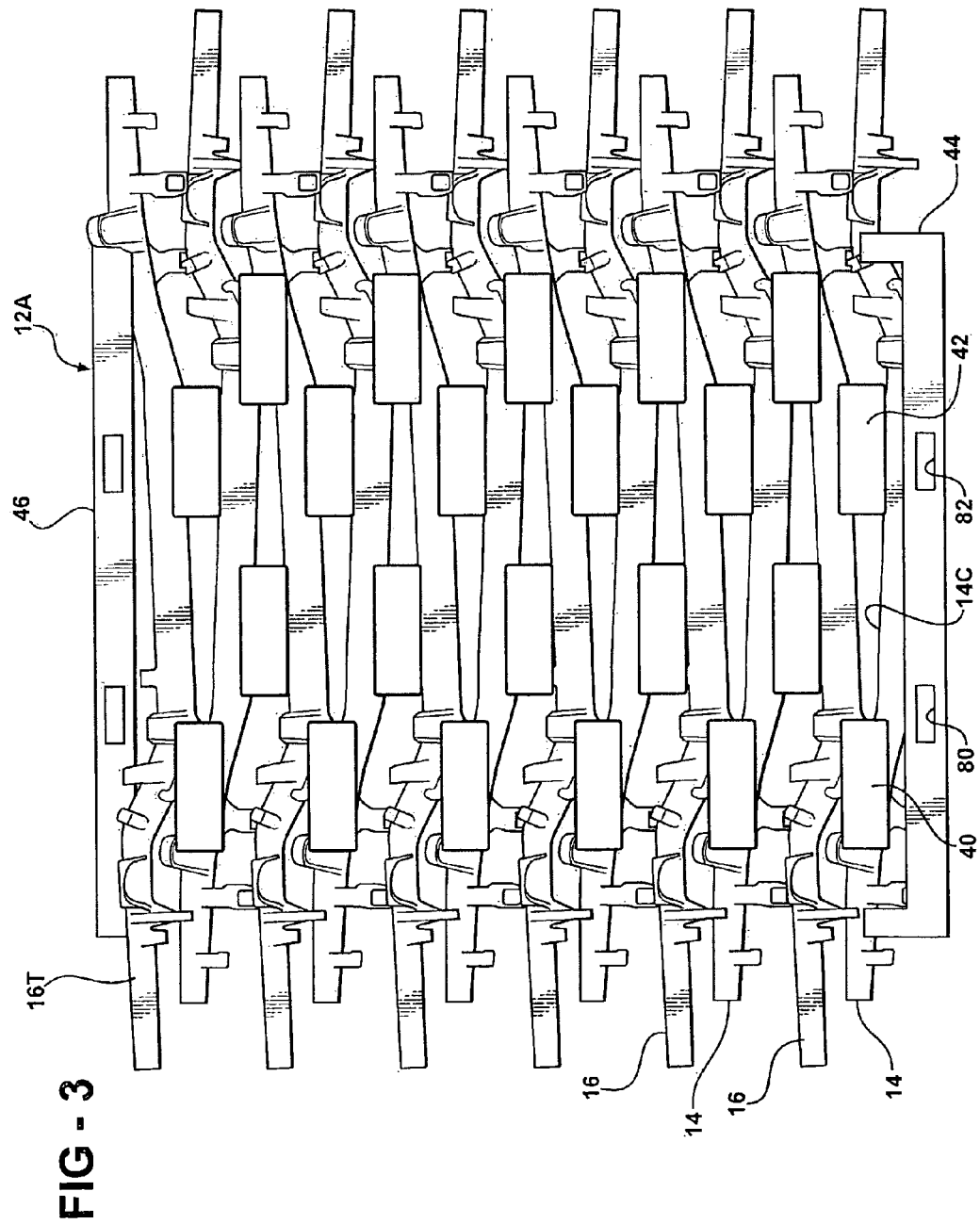
FIG. 3 is a side view of an entire stack of frames with top and bottom members added to complete a stack ready for banding.

As shown in FIG. 3, while the terms "lowermost" and "uppermost" are used in connection with describing what is shown in FIG. 1, there are typically more than two frames in each stack, in the illustration of FIG. 3, there are twelve frames with those frames numbered 14 and 16 to represent longitudinally alternating or reversed orientation repeating as one moves up the stack. All frames are three-dimensional in the sense that when viewed from the side, the various longitudinal sections thereof are not monoplanar.

In accordance with the invention, molded plastic spacers 40 and 42 are disposed between frames in the stack and are strategically designed and placed as hereinafter described.

As also represented in FIG. 3, the individual frames 14 and 16 are not in and of themselves longitudinally symmetrical or mirror image about a center plane; i.e., the rear of frame 14, shown to the right in FIG. 3, has a longer length and a lesser vertical displacement, relative to the center section 16C. Accordingly, the frame 14 does riot sit level on the base pallet 44 but, rather, is tipped up at the left end as shown in FIG. 3. The next frame 16 up in the sequence is longitudinally reversed and, therefore, tipped up on the right side and the frames 14, 16 continue to alternate in end-for-end reversed direction as one moves up the stack. A top cover 46 is placed upon the uppermost frame 16T so that the entire stack 12A can be banded down to the load surface 10 of the railroad car in a conventional fashion (not shown in FIG. 3).

Looking now to FIGS. 2, 4, 5 and 6, the details of the spatial relationship between the frames 14 and 16 and the spacer 40 will be described. In general, the spacer 40 is preferably, but not necessarily, of twin sheet plastic construction. As used herein, the term "twin sheet" refers to a body of plastic, typically high-density polyethylene (HDPE), and is constructed by thermoforming two sheets of HDPE with elevation changes or contours which not only accommodate the frames 14 and 16 at the spacer location but also allow the upper and lower thermoformed sheets of the spacer 40 to meet and fuse around the periphery thereof as well as at interior locations so as to provide a solid plastic route through which to transmit the loads created by the stacking of the frames 14 and 16 as shown.

Figure 4:
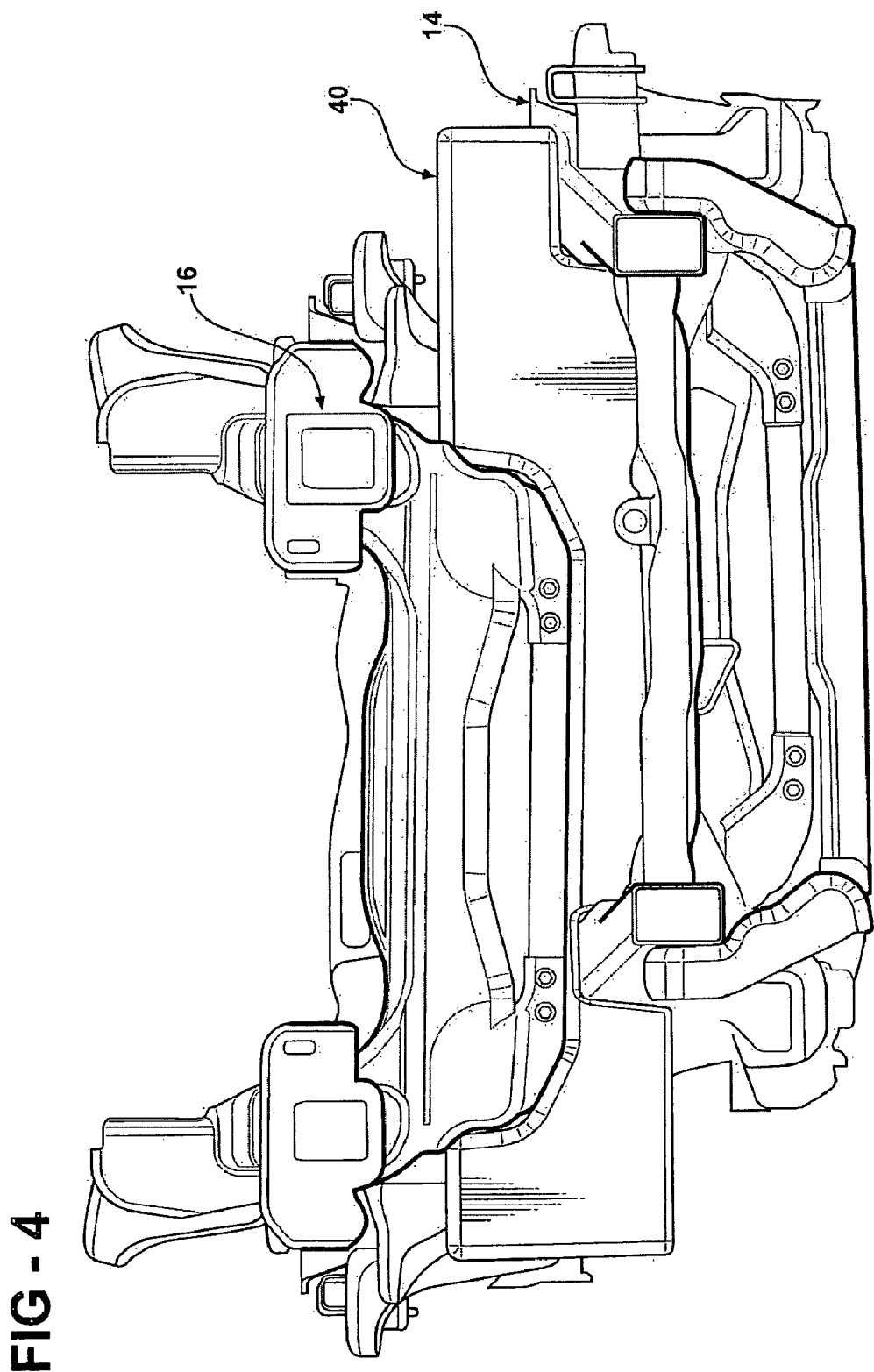
FIG. 4 is a front perspective-view of the elements of FIG. 1.
Figure 5:
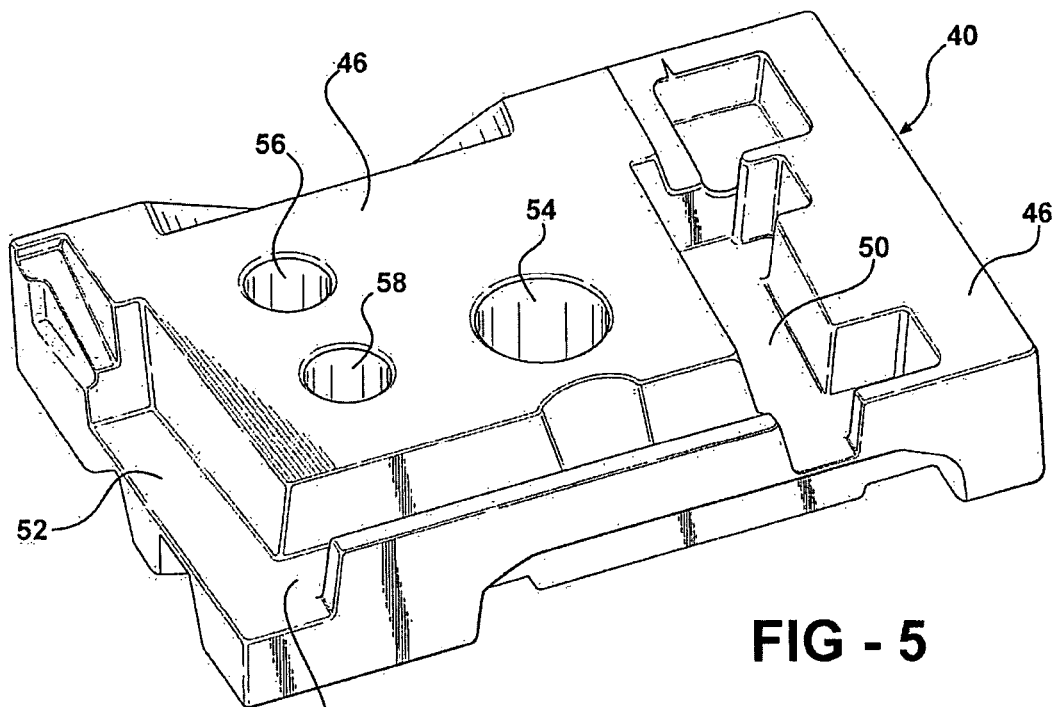
FIG. 5 is a bottom perspective view the FIG. 2 spacer.
Figure 6:
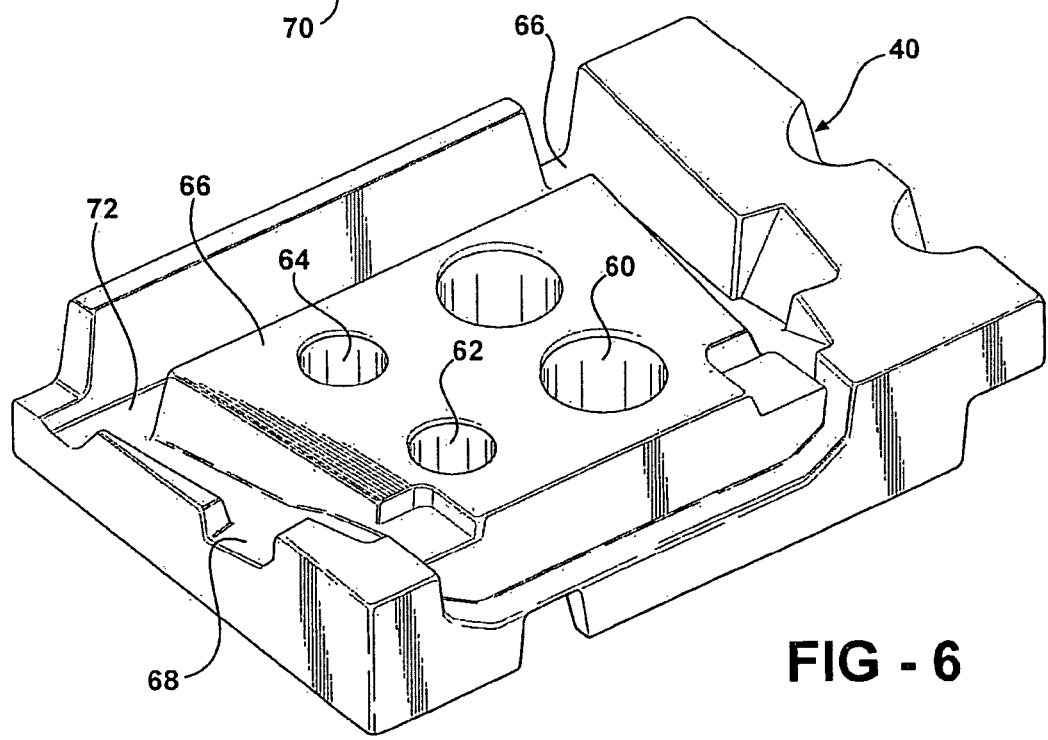
FIG. 6 is a top perspective view of the FIG. 2 spacer.

Looking first at FIGS. 4 and 5, the spacer 40 is generally configured such that the bottom surface shown in FIG. 5 conforms to the upper surfaces of components at one end of frame 14 whereas the top contours of the spacer 40 as shown in FIG. 6 correspond to the bottom contour of the opposite end of the next frame 16 in the stack. Specifically, the bottom surface of spacer 40 shown in FIG. 5 exhibits a deck elevation 46 and depressed lower landing elevations or surfaces 50 and 52 to receive the frame rails 18 and 20 of the lower frame 14. In addition, bosses 54, 56 and 58 are formed in the spacer 40 to a depth which reaches and fuses to corresponding bosses 60, 62 and 64 in the deck surface 66 of the opposite side of the spacers shown in FIG. 6; i.e., the bottom of boss 54 fuses or "knits" to the bottom of boss 60 and so on. The deck surface or top surface of the spacer 40 shown in FIG. 6 is also contoured with channels 66 and 68 to receive the frame rails of the lower opposite end of the frame 16 which rests upon and nests into the spacer 40 as shown in FIG. 4. The landings 50 and 52 are joined by a cross landing surface 70 to accommodate a cross bar of one frame whereas the landing surfaces 66 and 68 of the top surface shown in FIG. 6 are joined by a cross landing surface 72 to accommodate another cross member of the contacting frame.

Although not shown in detail, it will be understood that the contours and construction of the spacer 42 are similar to the spacer 40 in that it is also made of twin sheet, high density polyethylene construction conformed to received the opposite contours of the upper and lower frames which contact the spacer and to provide a load transmission path through solid plastic as described with reference to spacer 42. Spacers 40 and 42 are typically different because of the lack of longitudinal symmetry of the frames.

Figure 2:
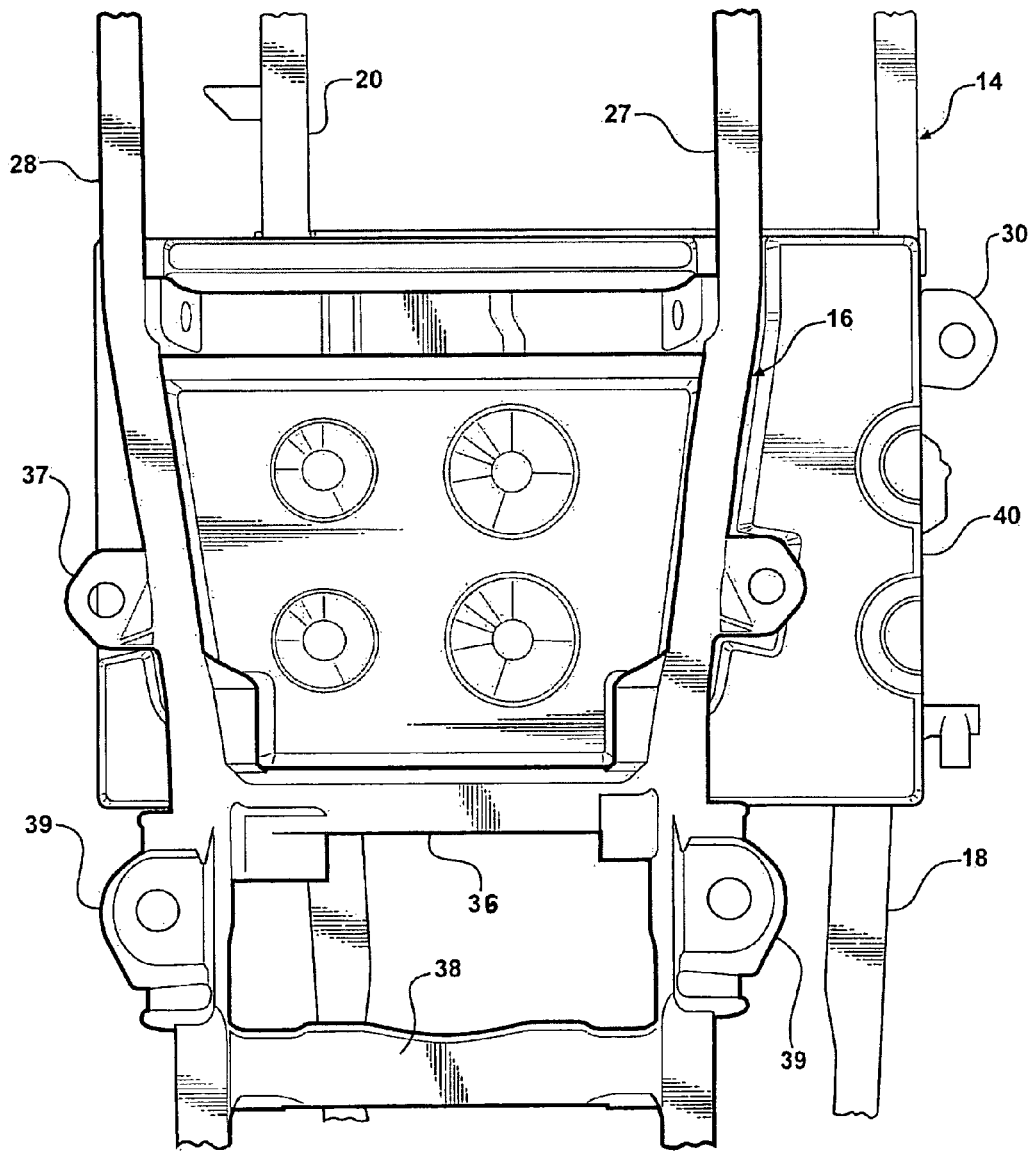
FIG. 2 is a top plan view of a portion of one stack in the group of stacks from FIG. 1 showing the location and top detail of one spacer as well as the laterally offset and longitudinally reversed orientation of two frames in the stack.

It will be noted in FIG. 2 that the frames 14 and 16 are not only reversed end for end but are also alternately laterally offset. On the other hand, the frames 14 and 16 as well as all additional frames in the stack are all oriented in the upright position; i.e., top up. In addition, it will be noted that, although the frames are longitudinally reversed and laterally offset, the structural component of one frame always directly overlies a structural component of the next frame below it and it is in this overlying area that it is preferable to bring the mating top and bottom spacer sheets together to be fused into a solid mass for load transmission purposes. While in the case of FIG. 2 the overlying structural frame members tend to be cross rails and side rails, the overlap can also occur between, for example, side rails, and body mounts or side rails and suspension mounts or either of the two mounts and one or more cross rails.

To summarize, the arrangement shown in FIGS. 1 through 4 is typically arrived at by creating a database from which a full graphic representation of two of the frames can be generated and manipulated relative to one another in space on a computer screen. Two such frames are generated in three dimensions on a computer screen and manipulated; e.g., rotated end for end and reoriented relative to one another electronically until the optimum nesting interrelationship is found, usually the stacked relationship of minimum height. In the case of the frames 14 and 16, this involves not only end for end reversal but also longitudinal and lateral offsetting as best illustrated in FIG. 3. Even some tipping about a longitudinal axis of symmetry may be required. Spacer locations are then chosen and are designed to essentially fill up the space between the frames while providing a load transmission path through knitted plastic as described above.

A base pallet 44 is designed in such a way as to represent only the upper halves of the two spacers since it receives only the bottom surfaces of the two longitudinally spaced portions of the lowermost frame 14 where support is to be provided. The bottom pallet 44 is also provided with forklift openings 80 and 82 so as to be easily moved about onto and off of the loading surface 10 by a forklift truck or other appropriate mechanism. After the frames and spacers are stacked up to the desired height as shown in FIG. 3, the top plate 46, made of plastic or metal or a combination of the two and also contoured to the opposite upper surfaces of the top frame 16T is put in place. Steel bands are then wrapped around the laterally adjacent stack to prevent them from shifting, or "racking" during movement of the railroad car providing the loading surface 10. The banding of frame stacks is conventional and need not be described here in detail apart from the fact that the upper plate or cover 46 is preferably contoured to match the opposite end contours of the topmost frame 16T.

Figure 7:
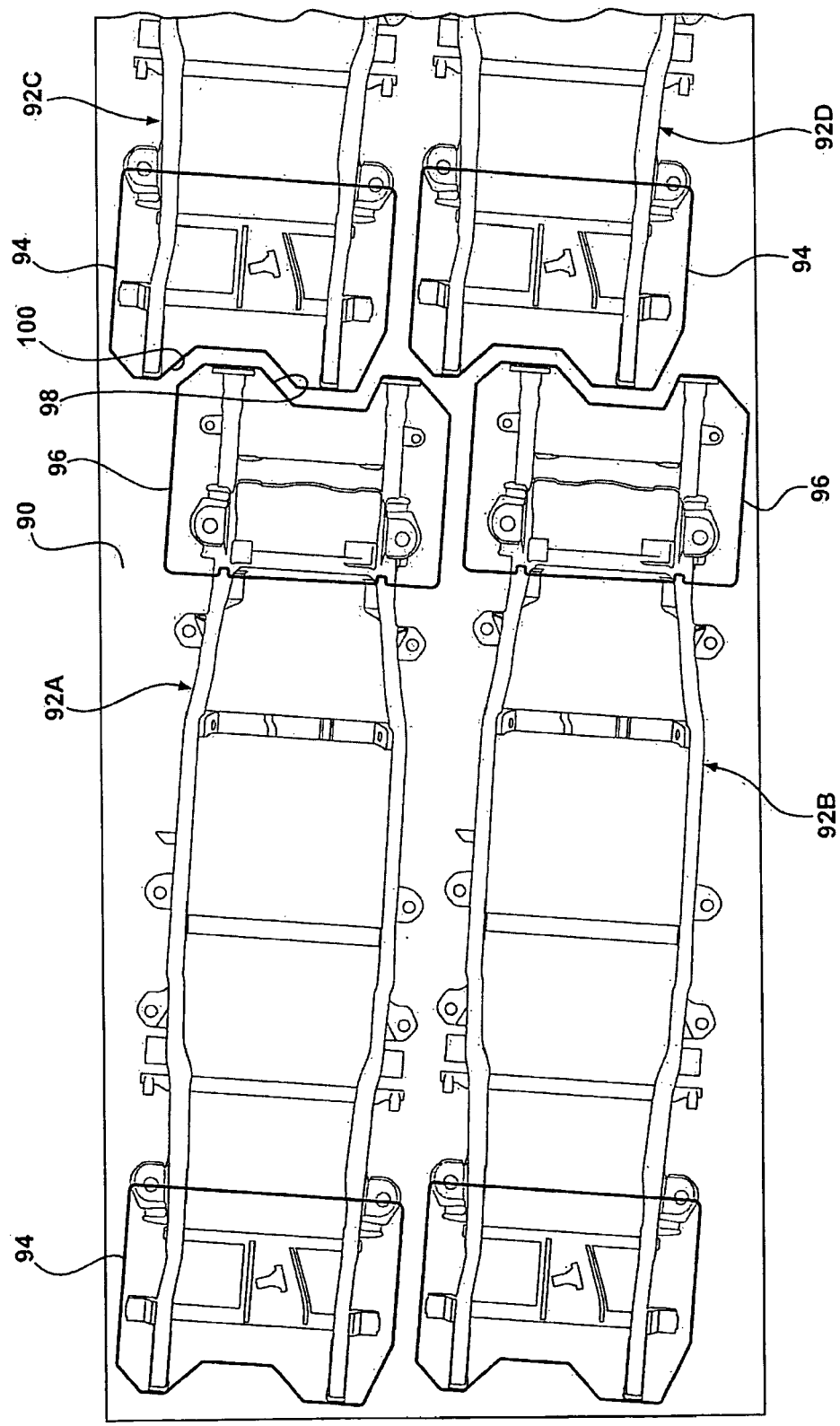
FIG. 7 is a top plan view of a second embodiment of the invention showing stacks of frames in angular relationship to the longitudinal axis of the loading surface and longitudinally nested with spacers of complemental configuration.

Referring now to FIGS. 7 through 10, another embodiment of the invention is shown wherein frames 92A, 92B, 92C and 92D are stacked on the loading surface 90 of, for example, a railroad flat car or highway truck, as the case may be. Again, all of the frames are alike and are made up of laterally spaced apart, longitudinally extending frame rails joined by cross rails and equipped with suspension, engine and body mount appendages as shown. Only the lowermost tier or level of frames in each of the frame stacks is shown in FIG. 7. All of these frames are oriented essentially north to north on the load surface 90; i.e., there is no end for end reversal of any of the frames in the four representative stacks shown. Although they can be aligned with the longitudinal surface centerline, the stacks are here shown angled by approximately 10° from the longitudinal axis of the load surface 90; i.e., the axis which runs from left to right through the center of the load surface 90 as shown in FIG. 7. In addition, the frames are laterally staggered and overlapped to increase the density of each frame stack on the load surface 90 and effectively shorten the longitudinal dimension of each frame stack so at least two of the additional frame stacks can be added to each railroad car or truck.

The frame stacks are provided with twin sheet molded plastic spacers 94 and 96 which have complemental contours on the abutting surfaces so that they may be complementally interfit or nested with one another as shown in FIG. 7. The bottom surface of spacer 96 conforms to the top surface of the underlying frame in the stack 92A at what we will call the rear end of the frame whereas spacer 94 has a bottom surface which conforms to the upper surface of the opposite or front end of the frame 92A. All of the spacers 94 are alike and all of the spacers 96 are alike. The top surfaces of all of the spacers will reverse the order assuming the frames in the stack are laterally offset and longitudinally reversed as was the case with respect to FIG. 1. In other words, the arrangement of FIG. 7, when fully completed, is similar to that of FIG. 1 except that the frames are angled and internested longitudinally end for end and the spacers are moved out to the ends of the frame stacks. They complementally interfit or nest with one another by virtue of the contoured end surfaces 98 and 100. Again, the spacers are preferably of twin sheet construction with elevation contours and bosses which meet and fuse at a center seam to form a unitary, load-bearing body.

Figure 9:
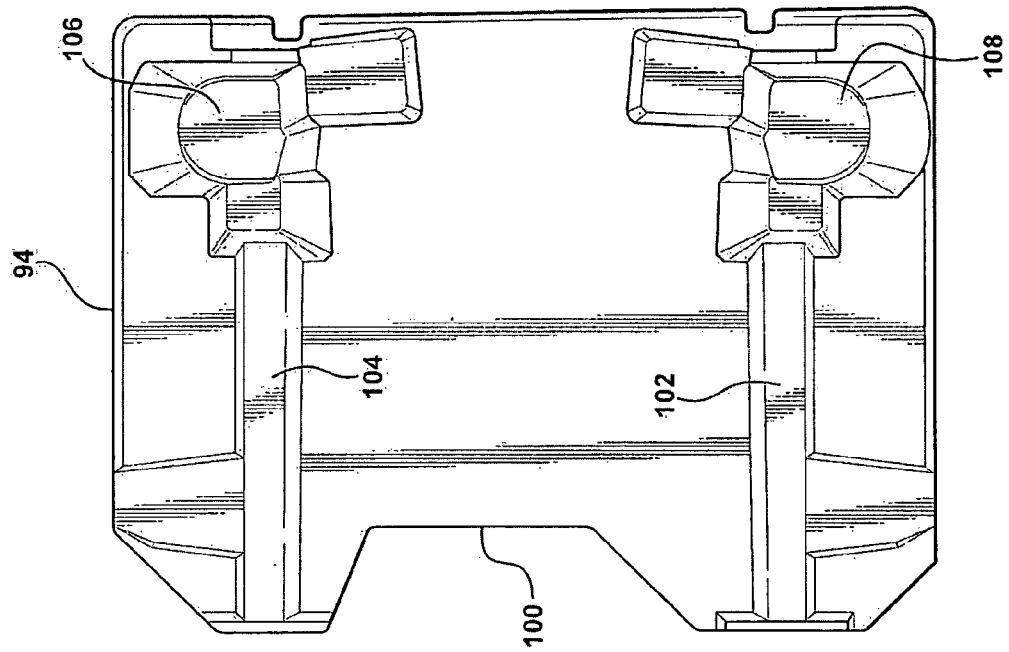
FIG. 9 is a bottom plan view of another spacer in the arrangement of FIG. 7.
Figure 8:
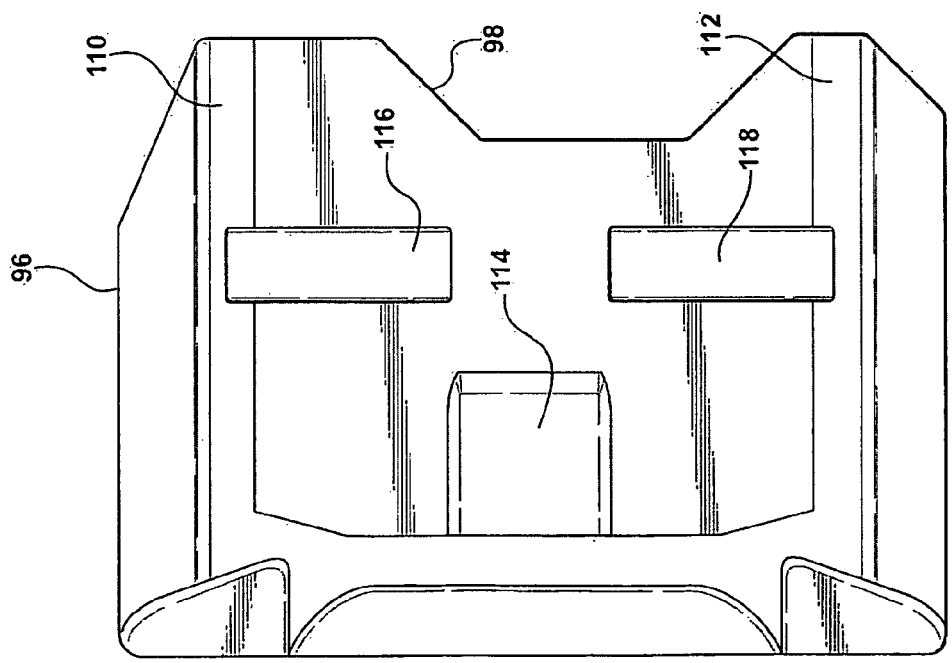
FIG. 8 is a bottom plan view of one of the spacers from FIG. 7.

By way of example, the spacer 94 as shown in FIGS. 9 and 10 is provided with depressed elevation landings 102 and 104 to accommodate frame rails and receptacles 106 and 108 to accommodate body or suspension mount appendages, whereas the surface 100 is recessed to interfit complementally with the surface 98 of the adjacent spacer 96. Spacer 96 is provided with longitudinal parallel recesses 110 and 112 to receive frame rails as well as depressions, 114, 116 and 118 to either receive other frame components or to provide bosses or similar surfaces which reach down to join and fuse with the corresponding depression material of the other sheet in the twin sheet plastic construction. Again the result is a unitary body having a bottom surface contour which corresponds to one end of a frame and a top surface contour that corresponds to the opposite end of the identical frame, as well as a twin sheet structure which provides solid plastic for strength in the load-bearing path. Of course, these details are provided by way of illustration and may not be necessary in the event the designer chooses, for example, to reinforce the plastic spacers with steel bars or to place fewer frames in a stack according to the individual needs of the transportation issue requiring a solution.

In summary, the invention provides a number of alternative and/or cooperative techniques for maximizing the number of frames which can be placed in a given volume and particularly maximizing the number of frames which can be stacked to a given height.

What is claimed is:

1. A method of shipping bare automotive vehicle frames on a transport vehicle such as a railroad car having a loading surface wherein the frames are of the type comprising spaced apart, substantially parallel frame rails joined by cross members wherein said frames have non-coplanar longitudinally-spaced span portions and are longitudinally asymmetrical, said method comprising the step of:

stacking said frames in uninverted but alternatingly longitudinally reversed relationship with one another and with attached spacers nestingly placed between said frames wherein said spacers are of a width which extends laterally across an entire frame and/or arranged in sets wherein each set comprises the first spacer between one end of adjacent frames in the stack and a second spacer between the opposite ends of the adjacent spacers in the stack.

2. The method of claim 1 wherein the spacers each have two working surfaces and are configured to nestingly and nonlockingly receive adjacent frames in a stack on opposite surfaces thereof such that one working surface is configured to receive the bottom of one frame and the other working surface is configured to receive the top of the adjacent, longitudinally reversed frame.

3. The method of claim 1 wherein alternate frames are laterally alternatingly offset from one another.

4. The method of claim 1 wherein the spacers are molded plastic.

5. A method of arranging automotive vehicle frames for shipment on a transport vehicle having a loading surface wherein the frames are of the type comprising spaced parallel, three-dimensional frame rails joined by cross members comprising the steps of:

arranging a first stack of frames on the surface as defined in claim 1; and arranging a second stack of frames on the surface wherein the frames in the second stack are in laterally offset, longitudinally overlapping relationship with the frames in the first stack.

6. The method of claim 5 wherein the frames are angled relative to the longitudinal axis of the load surface.

7. The method of claim 5 wherein the method further comprises the step of placing dunnage elements under the lowermost frames in the stack.

8. The method of claim 7 wherein the dunnage elements are complementally shaped to interfit with one another in the laterally offset longitudinally overlapping relationship.

9. A method of arranging elongated essentially bare motor vehicle frames on a railway flat car for shipment wherein the frames have a front end and a rear end and are noninvertingly positioned on the railway flatcar with their longitudinal dimensions extending substantially lengthwise of the railway flatcar and the frames positioned in the plurality of stacks spaced generally longitudinally along the railway flat car, characterized in that the number of frames that can be carried in the three dimensional space overlying the railway flat car is maximized by selectively varying one or more of:

the angle of the frames relative to the side edges of the railway flatcar;

the lateral position of one frame in a stack relative to an immediately adjacent frame in that stack;

the longitudinal orientation of one frame in a stack relative to the immediately adjacent frames in that stack without inverting any of the frames relative to one another; and the extent, if any, of overlapping of the ends of the frames in one stack relative to the confronting ends of the frames in an immediately adjacent stack.

10. A method according to claim 9 wherein:

the frames are angled relative to the side edges of the railway flatcar; and the ends of the frames in one stack overlap the ends of the frames in an immediately adjacent stack.

11. A method according to claim 9 wherein:

one frame in a stack is moved laterally relative to an immediately adjacent frame in that stack; and the front to rear direction of the one frame is reversed relative to the immediately adjacent frame.

12. A method according to claim 9 wherein:

one frame in a stack is longitudinally offset relative to an immediately adjacent frame in that stack; and the front to rear direction of the one frame is reversed relative to the immediately adjacent frame in that stack.

13. A method of determining how to stack bare vehicle frames of the type comprising nonplanar longitudinal rails joined by cross members and having different physical configurations at the opposite ends thereof so as to achieve a maximum number of frames in a given vertical dimension comprising the steps of:

creating an electronic database from which three-dimensional, graphic images of a frame can be generated and reoriented in space; and longitudinally and/or laterally reorienting at least two images of the frame relative to and proximate one another until a stacked condition of minimum vertical dimension is found.

14. The method of claim 13 further including the step of determining the size and shape of at least one spacer which will fit between the two frames while substantially preserving the minimum vertical dimension orientation of the two frames.

* * * * *